United States Patent
Zhang et al.

(10) Patent No.: US 12,000,712 B1
(45) Date of Patent: Jun. 4, 2024

(54) RECYCLABLE INCLINATION MEASURING DEVICE

(71) Applicants: RAILWAY ENGINEERING RESEARCH INSTITUTE of CHINA ACADEMY of RAILWAY SCIENCES, Beijing (CN); CHINA ACADEMY OF RAILWAY SCIENCES, Beijing (CN)

(72) Inventors: Yufang Zhang, Beijing (CN); Jian Li, Beijing (CN); Xu Gao, Beijing (CN); Guozhuang Song, Beijing (CN); Zhongmin Yang, Beijing (CN); Xin Dai, Beijing (CN); Shiyi Li, Beijing (CN); Qian Liu, Beijing (CN); Zonghao Wang, Beijing (CN); Hongze Guo, Beijing (CN)

(73) Assignees: RAILWAY ENGINEERING RESEARCH INSTITUTE OF CHINA ACADEMY OF RAILWAY SCIENCES, Beijing (CN); CHINA ACADEMY OF RAILWAY SCIENCES, Beijing (CN)

( * ) Notice: Subject to any disclaimer, the term of this patent is extended or adjusted under 35 U.S.C. 154(b) by 0 days.

(21) Appl. No.: 18/534,757

(22) Filed: Dec. 11, 2023

(30) Foreign Application Priority Data

Feb. 14, 2023 (CN) .......................... 202310107043.9

(51) Int. Cl.
*G01C 9/06* (2006.01)
*G01P 15/18* (2013.01)

(52) U.S. Cl.
CPC ................ *G01C 9/06* (2013.01); *G01P 15/18* (2013.01)

(58) Field of Classification Search
CPC .................................. G01C 9/06; G01P 15/18
(Continued)

(56) References Cited

U.S. PATENT DOCUMENTS

| | | | | |
|---|---|---|---|---|
| 4,823,125 A | * | 4/1989 | Rorden | E21B 47/024 340/854.6 |
| 6,065,218 A | * | 5/2000 | Edwards | E21B 47/00 33/544.2 |

(Continued)

FOREIGN PATENT DOCUMENTS

| | | |
|---|---|---|
| CN | 110186347 A | 8/2019 |
| CN | 214666702 U | 11/2021 |

*Primary Examiner* — George B Bennett
(74) *Attorney, Agent, or Firm* — Bayramoglu Law Offices LLC

(57) ABSTRACT

A recyclable inclination measuring device includes measuring units arranged in a linear array during installation, and two adjacent measuring units are eccentrically hinged by a joint; during the measurement, measuring units are arranged in a Z shape in the measuring tube, the inner wall of the measuring tube is closely attached to the joint, and measuring units extending out of the measuring tube are folded and arranged. the present invention adopts a recyclable inclination measuring device with the above structure, during the measurement, it is placed in the measuring tube, which can be arranged in a Z shape under the action of gravity, and then it can be measured with the synchronous rotation of the measuring tube, when it is recovered, it only needs to be pulled out, which reduces the difficulty of recovery and improves the recovery efficiency.

5 Claims, 3 Drawing Sheets

(58) Field of Classification Search
USPC .................................. 33/302, 303, 304, 313
See application file for complete search history.

(56) References Cited

U.S. PATENT DOCUMENTS

| | | | | |
|---|---|---|---|---|
| 6,467,557 B1 * | 10/2002 | Krueger | .................... | E21B 4/18 |
| | | | | 175/45 |
| 7,975,392 B1 * | 7/2011 | Spaulding | ............. | E21B 47/022 |
| | | | | 33/313 |
| 8,678,109 B2 * | 3/2014 | Orban | ..................... | E21B 25/00 |
| | | | | 175/244 |
| 8,752,305 B2 * | 6/2014 | DiFoggio | .............. | E21B 47/024 |
| | | | | 33/308 |
| 9,777,568 B2 * | 10/2017 | Danisch | ................... | E02D 31/00 |
| 10,119,368 B2 * | 11/2018 | Tunget | .................... | E21B 29/00 |
| 10,221,675 B2 * | 3/2019 | Danisch | ................. | G01C 15/00 |
| 11,231,407 B2 * | 1/2022 | Price | .................... | E21B 49/081 |
| 11,614,326 B2 * | 3/2023 | Drewett | ................... | G01C 9/08 |
| | | | | 33/333 |

* cited by examiner

RECYCLABLE INCLINATION MEASURING DEVICE

CROSS REFERENCE TO THE RELATED APPLICATIONS

This application is based upon and claims priority to Chinese Patent Application No. 202310107043.9, filed on Feb. 14, 2023, the entire contents of which are incorporated herein by reference.

TECHNICAL FIELD

The invention relates to the inclinometer technology, in particular to a recyclable inclination measuring device.

BACKGROUND ART

The inclinometer is an instrument used to measure the top angle and azimuth angle of engineering structures such as boreholes, foundation pits, foundation foundations, walls and dam slopes.

In the field of geotechnical engineering, the general fixed tiltmeter is composed of sets of measuring units, each measuring unit is built with an acceleration sensor, the vertical inclination of the measuring structure is realized by the combination of the roller on the structure and the groove in the measuring tube. When the structure deforms, the structure drives the inclinometer tube to deform together, thus driving the change of the angle of the fixed inclinometer.

It has the following disadvantages:

1. Because the inclinometer needs to be fixed in the inclinometer tube of a certain specification of the borehole, because it contains a guide wheel mechanism, the aperture through which it can pass is generally large. When the aperture is deformed, it may be stuck and lose the value of recovery.

2. Because the traditional inclinometer is assembled in sections, and the sensor cable joint is waterproofed when connected, the installation is cumbersome, and because of its complex structure, the cost is relatively high.

In recent years, the new inclinometer device generally consists of a plurality of measuring units in series to form a measurement column (inclinometer rope), and the measuring unit includes a rigid tube and a flexible joint. Because its structure does not have a mounting guide wheel, it does not need to be fixed in the groove of the inclinometer tube when installed.

It has the following disadvantages:

1. Because it is the overall package, the waterproof requirements of the system is relatively high. As the weakest link of the system, the flexible joint is easy to damage and lead to the failure of the whole system.

2. To improve the accuracy of the system, the flexible joint of the measuring rope is generally short, so it is generally packaged with a reel. Therefore, the length of the unit section cannot be done very long, generally not more than 1 meter, and the volume is relatively large, which increases the difficulty and cost of construction.

3. When the length of the inclinometer rope and the depth of the borehole are not matched, the part of the exposed surface is difficult to deal with, and it also affects the monitoring accuracy.

4. In the actual application process, the recycling is very professional, and it is necessary to prevent the torsion of the flexible joint, meanwhile, it is necessary to find the original packaging reel, rewind the equipment to the reel, and do a good job of protection. Therefore, it is difficult to complete the recovery on site.

SUMMARY

The purpose of the invention is to provide a recyclable inclination measuring device, combining the advantages of inclinometer rope and fixed inclinometer, which solves the problems of high price, difficult construction and easy blockage in recovery of the existing fixed inclinometer, meanwhile, it solves the problems of easy damage of inclinometer rope, difficult maintenance, heavy packaging, limited length of unit section and difficult recovery.

During the measurement, it is placed in the measuring tube, which can be arranged in a Z shape under the action of gravity, and then it can be measured with the synchronous rotation of the measuring tube, when it is recycled, it only needs to be pulled out, which reduces the difficulty of recovery and improves the recovery efficiency.

To achieve the above purpose, the present invention provides a recyclable inclination measuring device, which comprises measuring units arranged in a linear array during installation, and two adjacent measuring units are eccentrically hinged by a joint;

during the measurement, measuring units are arranged in a Z shape in the measuring tube, the inner wall of the measuring tube is closely attached to the joint, and measuring units extending out of the measuring tube are folded and arranged.

Preferably, the joint includes a flexible hinge joint and a rigid hinge joint arranged in an axisymmetric manner, and the cross sections of the flexible hinge joint and the rigid hinge joint are both right-angled triangular structures.

The tip of the flexible hinge joint and the tip of the rigid hinge joint are rotationally connected by the hinge shaft.

Preferably, the two ends of the measuring unit are arranged with the flexible hinge joint and the rigid hinge joint respectively, and the flexible hinge joint and the rigid hinge joint on the same measuring unit are arranged symmetrically.

Preferably, the flexible hinge joint is made of flexible material with a certain amount of deformation, and the rigid hinge joint is made of rigid material without deformation.

Preferably, the measuring unit includes a rigid rod and a three-axis acceleration sensor arranged in the middle of the rigid rod by the package box.

Preferably, both ends of the three-axis acceleration sensor are connected with an outlet cable, and the outlet cable is connected with the package box and the joint in turn.

Preferably, the right angle surface of the flexible hinge joint and the right angle surface of the rigid hinge joint are fixedly connected with the rigid rod, and the other angle surface of the flexible hinge joint and the other angle surface of the rigid hinge joint are respectively flush with the symmetrical sides of the rigid rod.

Preferably, the flexible hinge joint and the rigid hinge joint are interference fit with the inner wall of the rigid rod.

Preferably, the triaxial acceleration sensor is waterproofed by ip68.

Therefore, the invention adopts a recyclable inclination measuring device of the structure, and has the following beneficial effects:

1. foldable structure, easy to recycle;
2. the three-axis acceleration sensor is packaged separately, so that when a sensor is damaged, it will not cause damage to the entire equipment, reducing maintenance costs;
3. The one-line structure setting increases the selectivity of the length of the unit section while reducing the cost of transportation and recycling.

The following is a further detailed description of the technical scheme of the invention through the drawings and embodiments.

Figure 1:
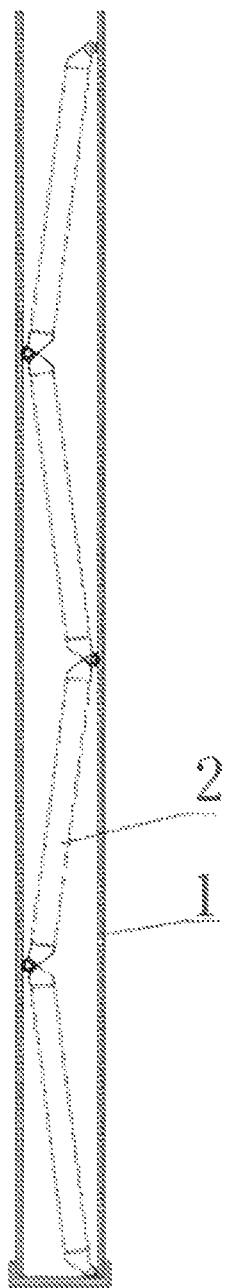
FIG. 1 is a measurement time state diagram of the recyclable measuring device of the present invention.
Figure 2:
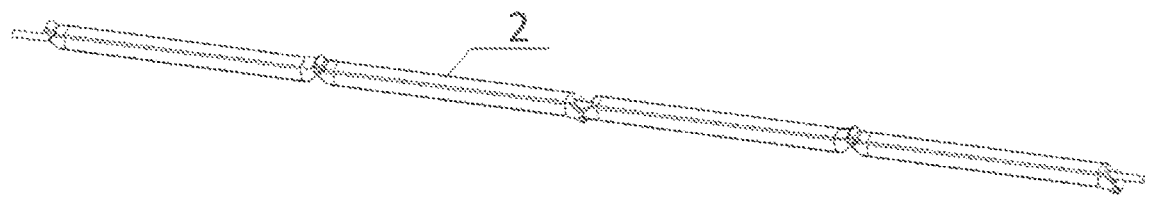
FIG. 2 is an installation state diagram of the recyclable measuring device of the present invention.
Figure 3:
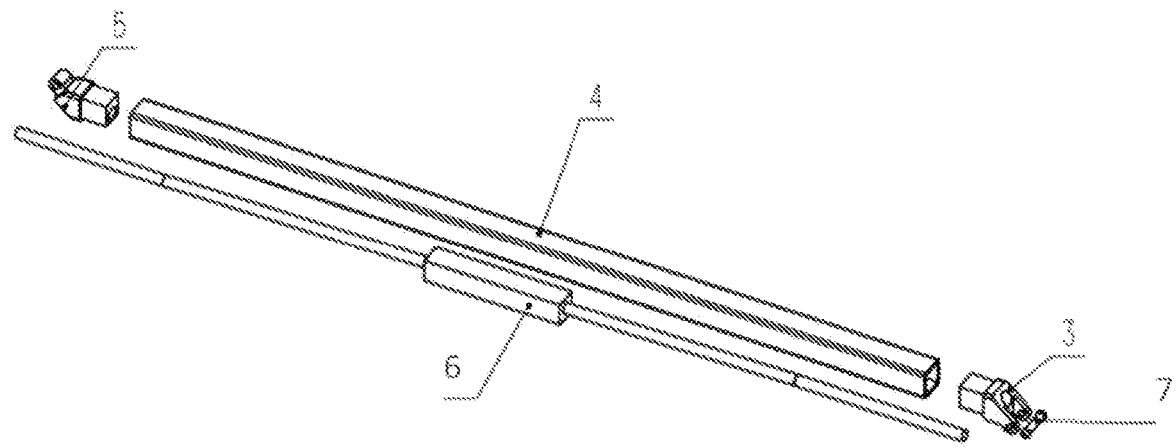
FIG. 3 is a structural explosion diagram of the measuring unit of the recyclable measuring device of the present invention.
Figure 4:
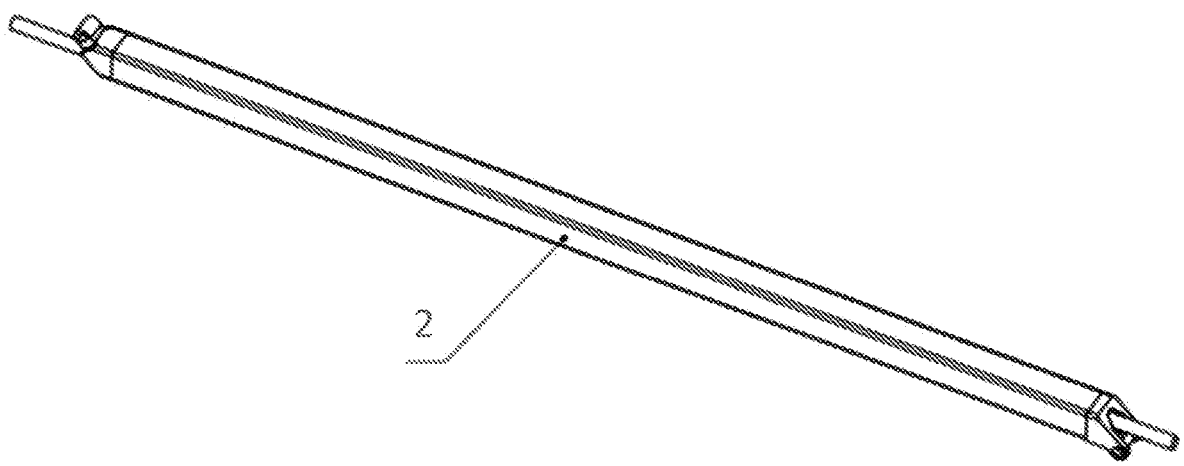
FIG. 4 is a structural assembly diagram of the measuring unit of the recyclable measuring device of the present invention.
Figure 5:
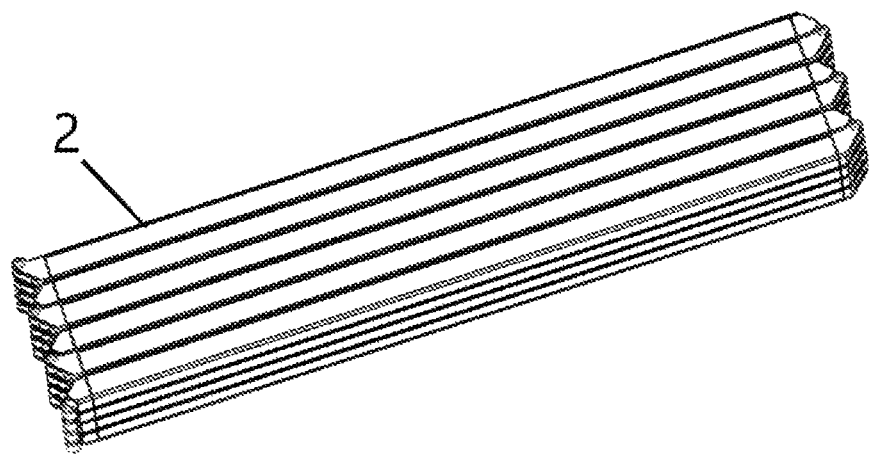
FIG. 5 is an unused state diagram of the recyclable measuring device of the present invention.

Wherein: 1, measuring tube; 2. measuring unit; 3, rigid hinge joint; 4, rigid rod; 5. flexible hinge joint; 6. packaging box; 7. hinge shaft.

DETAILED DESCRIPTION OF THE EMBODIMENTS

The following will be combined with the attached figure to further describe the invention. It should be noted that the implementation example is based on the premise of this technical scheme, and gives a detailed implementation method and specific operation process, but the scope of protection of the invention is not limited to the fact.

The public recyclable inclination measuring device of the present invention includes measuring units 2 arranged in a linear array during installation, and the two adjacent measuring units 2 are eccentrically hinged by a joint.

During the measurement, measuring units 2 are arranged in a Z shape in the measuring tube 1, the inner wall of the measuring tube 1 is closely attached to the joint, and measuring units 2 extending out of the measuring tube 1 are folded and arranged.

Preferably, the joint includes a flexible hinge joint 5 and a rigid hinge joint 3 arranged in an axisymmetric manner, wherein the cross-sections of the flexible hinge joint 5 and the rigid hinge joint 3 are all right-angle triangular structures; the tip of the flexible hinge joint 5 and the tip of the rigid hinge joint 3 are connected by rotating the hinge shaft 7. It realizes a greater degree of freedom when the joint rotates around the axis of the hinge shaft 7 (in this embodiment, the joint can rotate 180° around the hinge shaft 7), so that the main slip direction can be used during measurement. The material of flexible hinge joint 5 is flexible and can be used as angle compensation in the direction of secondary slip. It meets the requirements of large main slip angle and small side slip angle during monitoring, and can effectively reduce the torsion along the axis direction.

Preferably, the flexible hinge joint 5 and the rigid hinge joint 3 are arranged at both ends of the measuring unit 2, and the flexible hinge joint 5 and the rigid hinge joint 3 on the same measuring unit 2 are arranged symmetrically.

Preferably, the flexible hinge joint 5 is made of a flexible material with a certain amount of deformation, and the rigid hinge joint 3 is made of a rigid material without deformation.

Preferably, measuring unit 2 includes a rigid rod 4 and a three-axis acceleration sensor set in the middle of the rigid rod 4 by the packaging box 6.

Preferably, both ends of the three-axis acceleration sensor are connected with an outlet cable, and the outlet cable is connected with the package box 6 and the joint in turn, the data bus communication is adopted to avoid the cumbersome and unreliable field wiring.

Preferably, the right-angle surface of the flexible hinge joint 5 and the right-angle surface of the rigid hinge joint 3 are fixedly connected to the rigid rod 4, the other corner surface of the flexible hinge joint 5 and the other corner surface of the rigid hinge joint 3 are respectively flushed with the symmetrical sides of the rigid rod 4, which is convenient for folding and extending multiple measuring units of the measuring tube 1.

The preferred flexible hinge joint 5 and the rigid hinge joint 3 are all matched with the inner wall interference of the rigid rod 4.

Preferred, three axis acceleration sensor by ip68 waterproof treatment

Workflow: when installing, firstly expanding a plurality of measuring unit 2, so that measuring units 2 are arranged at a straight shape, and then putting it into the measuring tube 1, after touching the bottom, continuing to put down, under the action of gravity, the measuring unit 2 is folded in the measuring tube 1 until the joint is closely attached to the inner wall of the measuring tube 1; then the measurement is carried out, during the measurement, the measuring tube 1 is tilted to drive the joint to follow, so as to drive the internal three-axis acceleration sensor to follow, so that the monitoring data can be received through the outlet cable, after the measurement is completed, the recycle is carried out, when completing the recycle, the measuring device is pulled out outward until it is completely taken out and restore the straight shape, then it is folded so that the sidewalls of the rigid rod 4 of the two adjacent measuring units 2 are bonded in turn, which reduces the storage surface.

Therefore, the present invention adopts a recyclable inclination measuring device with the above structure, during the measurement, it is placed in the measuring tube, which can be arranged in a Z shape under the action of gravity, and then it can be measured with the synchronous rotation of the measuring tube, when it is recovered, it only needs to be pulled out, which reduces the difficulty of recovery and improves the recovery efficiency.

Finally, it should be stated that the above embodiment is only used to explain the technical scheme of the invention and not to restrict it. Although the invention is described in detail with reference to the better embodiment, the ordinary technical personnel in this field should understand that they can still modify or replace the technical scheme of the invention, and these modifications or equivalent substitutions cannot make the modified technical scheme out of the spirit and scope of the technical scheme of the invention.

What is claimed is:

1. A recyclable inclination measuring device, comprising measuring units arranged in a linear array during installation, wherein two adjacent measuring units are eccentrically hinged by a joint;

during a measurement, the measuring units are arranged in a Z shape in a measuring tube, an inner wall of the measuring tube is closely attached to the joint, and the measuring units extending out of the measuring tube are folded and arranged;

the joint includes a flexible hinge joint and a rigid hinge joint arranged in an axisymmetric manner, and cross sections of the flexible hinge joint and the rigid hinge joint are both right-angled triangular structures;

a tip of the flexible hinge joint and a tip of the rigid hinge joint are rotationally connected by a hinge shaft;

the flexible hinge joint is made of a flexible material with deformation, and the rigid hinge joint is made of a rigid material without deformation;

two ends of each of the measuring units are arranged with the flexible hinge joint and the rigid hinge joint respectively, and the flexible hinge joint and the rigid hinge joint on the same measuring unit are arranged symmetrically;

each of the measuring units includes a rigid rod;

a first right angle surface of the flexible hinge joint and a first right angle surface of the rigid hinge joint are fixedly connected with the rigid rod, and a second right angle surface of the flexible hinge joint and a second right angle surface of the rigid hinge joint are respectively flush with symmetrical sides of the rigid rod.

2. The recyclable inclination measuring device according to claim 1, wherein each of the measuring units also includes a three-axis acceleration sensor arranged in a middle position of the rigid rod through a packaging box.

3. The recyclable inclination measuring device according to claim 2, wherein two ends of the three-axis acceleration sensor are connected to an outlet cable, and the outlet cable is sequentially connected to the packaging box and the joint.

4. The recyclable inclination measuring device according to claim 1, wherein both the flexible hinge joint and the rigid hinge joint are in interference fit with an inner wall of the rigid rod.

5. The recyclable inclination measuring device according to claim 2, wherein the three-axis acceleration sensor is waterproofed with an IP68 rating.

* * * * *